(12) United States Patent
De Block et al.

(10) Patent No.: US 6,910,244 B2
(45) Date of Patent: Jun. 28, 2005

(54) WIPER DEVICE ESPECIALLY FOR THE PANES OF MOTOR VEHICLES

(75) Inventors: Peter De Block, Halen (BE); Frans Breesch, Borgloon (BE); Peter Wijnants, Wezemaal (BE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 10/257,725
(22) PCT Filed: Feb. 1, 2002
(86) PCT No.: PCT/DE02/00375
§ 371 (c)(1),
(2), (4) Date: Apr. 21, 2003
(87) PCT Pub. No.: WO02/066300
PCT Pub. Date: Aug. 29, 2002

(65) Prior Publication Data
US 2003/0163885 A1 Sep. 4, 2003

(30) Foreign Application Priority Data
Feb. 21, 2001 (DE) ........................ 101 08 200

(51) Int. Cl.⁷ ................................ B60S 1/40
(52) U.S. Cl. ................. 15/250.32; 15/250.43
(58) Field of Search .................. 15/250.32, 250.44, 15/250.43, 250.351; 403/348, 349

(56) References Cited

U.S. PATENT DOCUMENTS

| 4,083,642 A | | 4/1978 | Journee | |
|---|---|---|---|---|
| 4,158,513 A | * | 6/1979 | Journee | ..................... 403/316 |
| 4,446,589 A | | 5/1984 | Maiocco | |
| 6,161,248 A | * | 12/2000 | Merkel et al. | ........... 15/250.32 |

FOREIGN PATENT DOCUMENTS

| DE | 1 505 397 | | 10/1969 |
|---|---|---|---|
| DE | 1 655 410 | | 8/1971 |
| DE | 26 40 399 | | 3/1977 |
| DE | 2604325 | * | 8/1977 |
| DE | 2816206 | * | 10/1979 |
| DE | 2817224 | * | 10/1979 |
| GB | 2 263 392 A | | 7/1993 |
| WO | 00 73113 A | | 12/2000 |

* cited by examiner

*Primary Examiner*—Gary K. Graham
(74) *Attorney, Agent, or Firm*—Michael J. Striker

(57) ABSTRACT

A wiper system is proposed, which is used to clean windows, in particular of motor vehicles. The wiper system has a driven wiper arm (12), guided on the motor vehicle and movable between two turning points, on whose free end (14), a pivot bolt (36) retained thereon is disposed, whose pivot axis (38) extends transversely to the longitudinal axis of the wiper arm, essentially in the direction of motion (double arrow 22) of the wiper arm (12), on which pivot bolt a wiper blade (16) is supported that can be pivoted about the pivot axis (38) and pressed against the window (28), and the wiper system has means for securing the wiper blade to the pivot bolt, which means have stop faces (78), (86) disposed on the wiper blade transversely to the pivot axis and spaced apart from one another and pointing away from one another, which fittingly engage between securing faces (80, 81), facing one another, of the wiper arm (12). A simple and economical wiper system is obtained if the stop faces of the wiper blade are disposed on the two long sides of a coupling part (32) that is present on the wiper blade and has a bearing bore (34) for the pivot bolt (36); that one securing face of the wiper arm is a cheek region (80) oriented toward the wiper blade; and that the other securing face (81) is embodied on an extension (44), protruding from the bearing bore (34), of the pivot bolt (36), which extension engages the stop face (86), facing away from the wiper arm, of the wiper blade (16) from behind.

11 Claims, 3 Drawing Sheets

WIPER DEVICE ESPECIALLY FOR THE PANES OF MOTOR VEHICLES

BACKGROUND OF THE INVENTION

The invention is based on a wiper system. In one known wiper system of this type (German Patent Disclosure DE 10 55 410 A1), the wiper arm and the wiper blade are disposed side by side, in terms of a view toward the window to be wiped, or one after the other, in terms of the direction of operation of the wiper system. As a result, a lower structural height for the wiper system is attained than is possible ‚n wiper systems in which the wiper arm is located above the wiper blade (DE 1505397 A1). The lesser structural height of the generic wiper system has advantages in terms of the behavior of the wiper blade with regard to lifting away from the window, especially at high vehicle speeds. In such a wiper system, so that the wiper blade will be secured to the pivot bolt during wiping operation, the pivot bolt disposed laterally on the wiper arm is provided in its middle portion with an annular groove, into which leaf spring, secured by one end to the wiper blade and deflectable counter to spring force, dips after the wiper blade has been mounted on the pivot bolt, and together with the side walls of the annular groove, this guarantees the securing of the wiper blade to the wiper arm. The two lateral annular faces of the annular groove form the securing faces of the wiper arm, while the side edges of the leaf spring act as stop faces of the wiper blade. The disposition and embodiment of such securing means is expensive, because on the one hand the pivot bolt has to be provided with the annular groove, and on the other, when a wiper blade is replaced, the new wiper blade has to be re-equipped with a suitable leaf spring.

In another known wiper system (DE 26 40 399 A1), the pivot bolt and its securing means are disposed on the wiper blade and are lost when the wiper blade is replaced and must therefore be provided on each wiper blade.

SUMMARY OF THE INVENTION

In the wiper blade of the invention, the wiper blade supported on the pivot bolt is disposed with the lateral stop faces of the coupling part between the cheek region of the wiper arm and the extension located on the free end of the pivot bolt and is thus secured in the direction of the pivot axis. Especially detent means on the wiper blade that are lost when a wiper blade is replaced are not needed, because their function is taken over by the long sides of the wiper blade that are always present, regardless of any separate coupling part.

In a refinement of the invention, the extension is solidly joined to the pivot bolt, and the bearing bore, on its jacket face, is provided with a push-through conduit that is adapted to the extension. This affords the capability of making the pivot bolt from a solid, inelastic material, such as metal.

An embodiment of the invention that is especially operationally reliable can be achieved if a plurality of extensions are disposed on the pivot bolt, and if the bearing bore, on its jacket face, has a plurality of push-through conduits, adapted to the extensions and corresponding in number to the number of extensions.

If the stop face of the wiper blade is embodied on the bottom face of a countersunk feature that extends from the opening of the bore in the circumferential direction and radially, which countersunk feature extends from the long side, remote from the wiper arm, of the coupling part in the direction of the pivot axis, then the extension dips into the countersunk feature. Hence the extension, which might be visually in the way, is no longer visible.

If furthermore the countersunk feature is embodied in annular-segmental fashion in the direction of the pivot axis, and the push-through conduit discharges into the countersunk feature, then at least one segment end face can be used as a stop or limiting face for the oscillating motion of the wiper blade in one direction of oscillation.

Expediently, the push-through conduit discharges into the countersunk feature near one annular-segmental end face, resulting in a defined mounting position for the wiper blade on the wiper arm.

In a refinement of the invention, the other annular-segmental end face forms an oscillation limitation for the wiper blade supported on the pivot bolt. As a result, the wiper blade on the wiper arm, if it lifts away from the window, cannot rotate approximately 180°, which means the wiper blade will not rest with its back on the window.

To assure a proper oscillating motion, which meets requirements, of the wiper blade on the pivot bolt, the segment angle is greater than the oscillating motion of the wiper blade about the pivot axis of the pivot bolt that occurs during wiping operation, plus the thickness of the extension.

So that the extension of the pivot bolt, which may protrude by a portion thereof from the countersunk feature, will not present any risk of injury to a person working with the wiper blade, for instance when cleaning the windshield by hand, the depth of the countersunk feature is at least as great as the height of the extension, measured in the direction of the pivot axis.

An especially economical embodiment of the concept of the invention is attained by providing that the extension is embodied on the order of a rectangular plate, one long side of which faces toward the pivot bolt and is joined, crossing the pivot axis, to the pivot bolt, preferably integrally, and its length is greater than the diameter of the pivot bolt. At the two places where the extension protrudes past the diameter of the pivot bolt, one securing face of the wiper arm can then be embodied in a simple way.

If furthermore the coupling part of the wiper system is retained on the upper band face, remote from the window, of a bandlike-elongated, spring-elastic support element, and over at least a portion it rests flatly on the support element, and furthermore a rubber-elastic wiper strip that can be placed against the window is disposed, parallel to the longitudinal axis, on the lower band face, oriented toward the window, of the support element, in especially low, lightweight wiper blade that is part of the wiper lever is obtained.

Further advantageous refinements and features of the invention are disclosed in the ensuing description of an exemplary embodiment shown in the associated drawing.

DESCRIPTION OF THE EXEMPLARY EMBODIMENT

Figure 1:
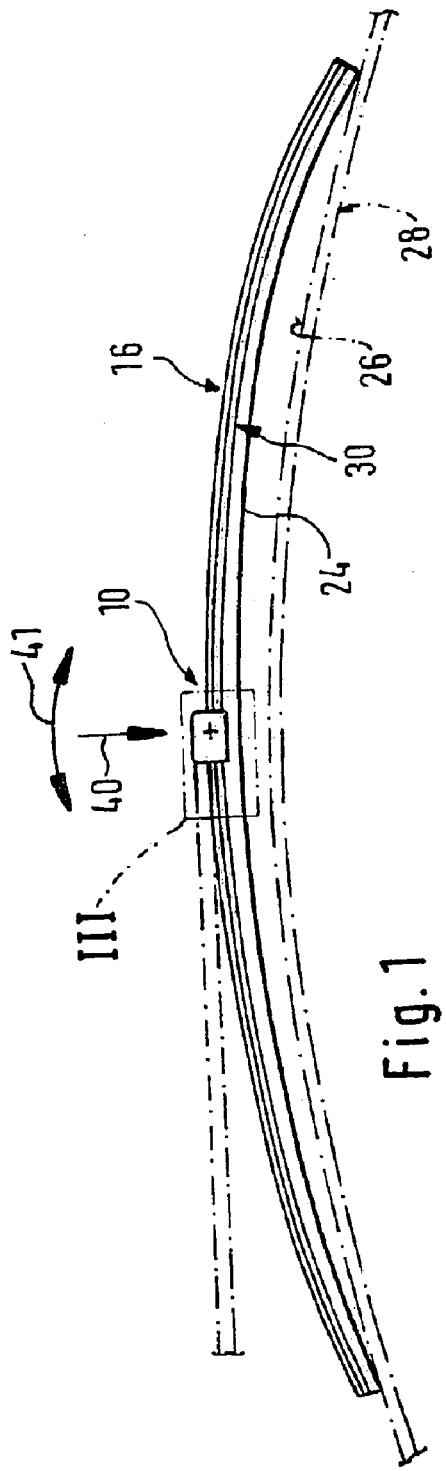
FIG. 1, a wiper system schematically shown in a side view.

A wiper system of the invention includes a wiper lever 10 (FIGS. 1 and 2), which has a driven wiper arm 12 on one end that is guided on the motor vehicle, not shown, and to whose free end 14 an elongated wiper blade 16 is pivotably connected. The wiper arm 12 is supported by its other end 18 and can be swiveled back and forth between turning points about a pendulum axis 20 in the direction of the double arrow 22. The wiper blade 16 is moved transversely to its length across the window to be wiped, and with a rubber-elastic wiper strip 24, it presses against the surface 26 of the window 28 to be wiped.

Figure 2:
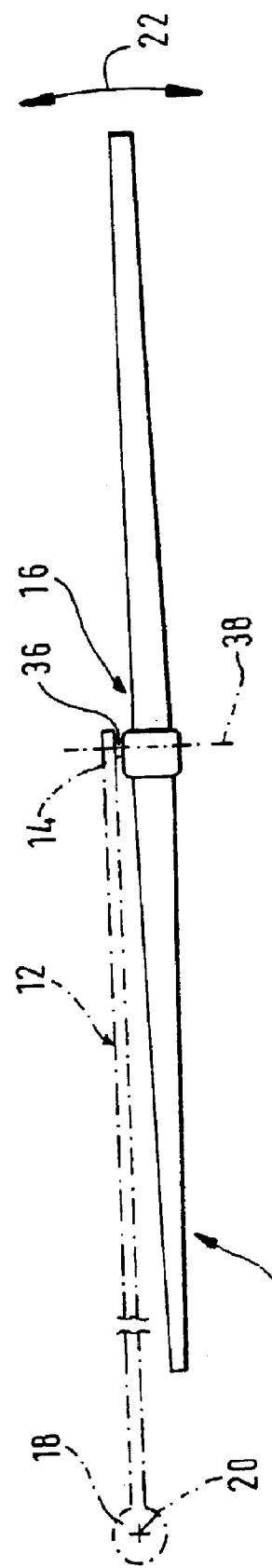
FIG. 2, the wiper system of FIG. 1 in a plan view.
Figure 4:
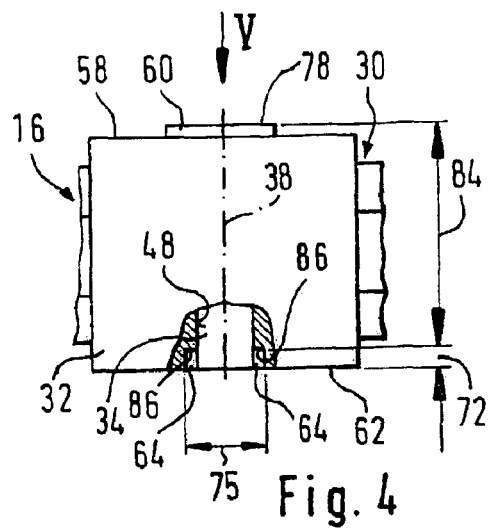
FIG. 4, a plan view on the arrangement of FIG. 3 in the direction of the arrow IV.
Figure 5:
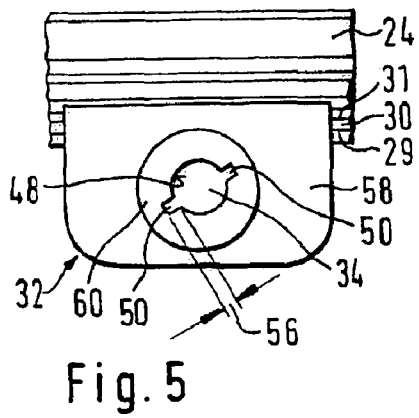
FIG. 5, a side view of the arrangement of FIG. 4 in the direction of the arrow V.
Figure 7:
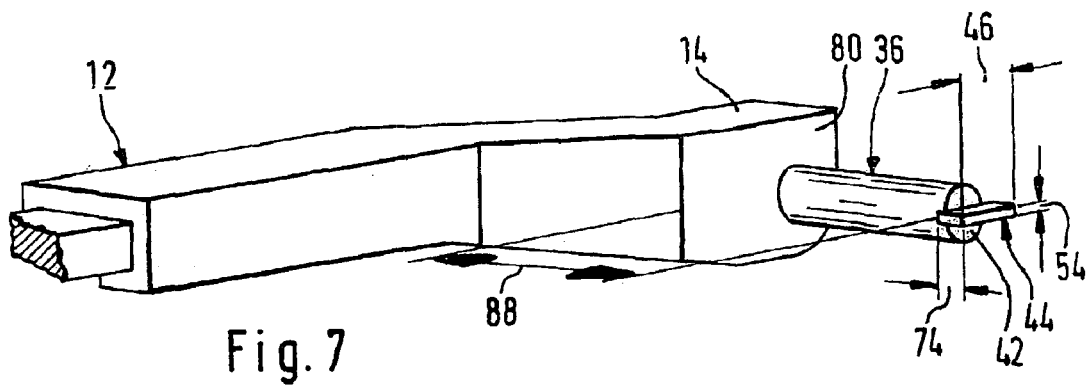
FIG. 7, a perspective view of the end portion, provided with a pivot bolt, of a wiper arm belonging to the wiper system.

The wiper strip 24 is joined, parallel to the longitudinal axis, to a bandlike-elongated, spring-elastic support element 30, on whose upper band face 29, facing away from the window, a coupling part 32 is seated (FIG. 8), by way of which the wiper blade 16 is pivotably connected to the wiper arm 20. To that end, the coupling part 32, resting flatly on the band face 29, is provided with a bearing bore 34 (FIGS. 3–5), which serves to receive a pivot bolt 36 that is joined solidly to the wiper arm 12 laterally on the free end 14 thereof (FIG. 7). The pivot bolt 36, or the pivot axis 38 (FIG. 2), thus extends essentially in the direction of the pendulum or operating motion (double arrow 22) of the wiper lever 10. As seen in FIG. 1, the surface 26 to be wiped of the window 28, which is represented by dot-dashed lines, is curved. Since the line 26 is meant to represent the greatest curvature of the window surface, it is quite clear that the curvature of the still unstressed wiper blade 16, resting with both ends on the window, is greater than the maximum curvature of the window. In response to a contact pressure exerted via the wiper arm 12 and acting in the direction of the arrow 40 (FIG. 1), the wiper blade presses over its entire length against the window surface 26 with its rubber-elastic wiper strip 24, disposed on the lower band face 31 of the support element 30. A tension thus builds up in the spring-elastic support element 30 made of metal, and this assures both a proper contact of the wiper strip 24 with the window 28 over the entire length of the wiper strip and a uniform distribution of the contact pressure. Since the window, which as a rule is curved spherically, does not represent a portion of a spherical surface, the wiper blade 16 relative to the wiper arm 12 must be capable of constantly adapting during its wiping motion to the particular location and course of the window surface. The pivot connection 34, 36 that makes an oscillating motion (double arrow 41) possible is therefore necessary between the wiper arm and the wiper blade.

Figure 6:
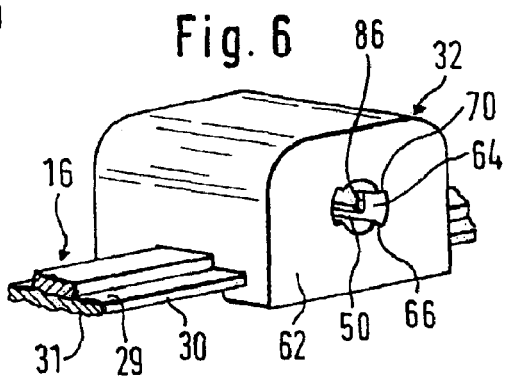
FIG. 6, a perspective view of the arrangement of FIG. 3.
Figure 8:
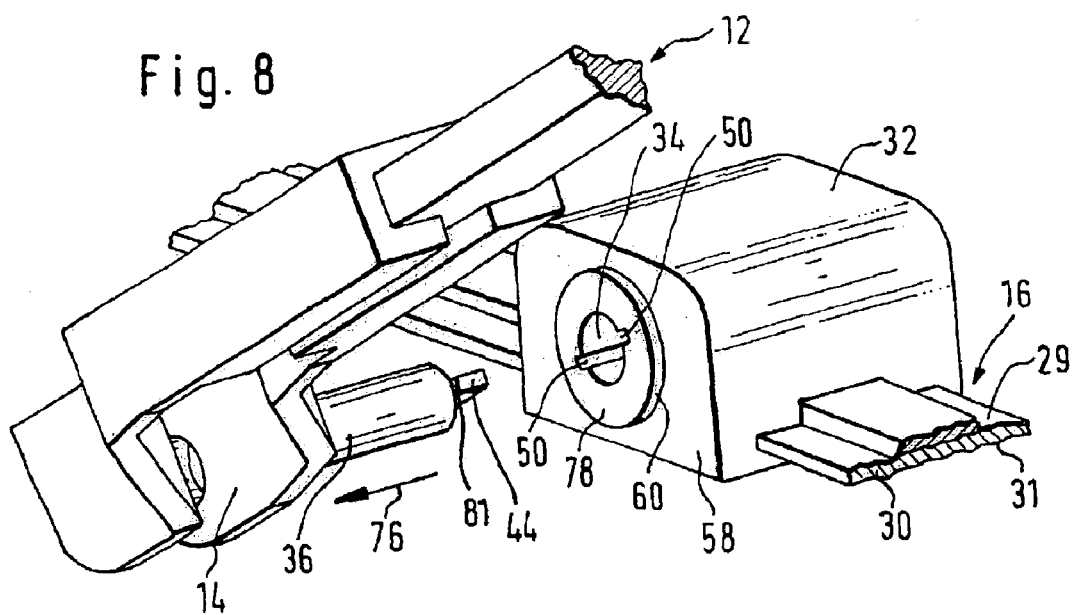
FIG. 8, the arrangement of FIGS. 6 and 7 in a preassembly position oriented toward one another, seen from the back side and in perspective.

This pivot connection will now be explained in conjunction with FIGS. 3–8. In FIGS. 6 and 8, only the upper region of the wiper blade 16 is shown, representing the connection between the coupling part 32 of the wiper strip 24 and the support element 30. To simplify the description, no further distinction will be made between the wiper strip 24 and the support element 30, since the connection between these two parts is of no significance for the design of the pivot connection between the wiper blade 16 and the wiper arm 12.

The part on the wiper arm of the oscillating pivot connection is formed by the pivot bolt 36 and its particular embodiment. As seen from FIG. 7, a platelike extension 44 is disposed on the end face 42 of the pivot bolt 36; one long side 81 of this extension is oriented toward the pivot bolt 36 and is integrally joined to it. The disposition of the extension 44 is made such that it crosses the longitudinal axis of the pivot bolt 36, which at the same time forms the pivot axis 38 of the pivot connection. The length 46 of the extension 44 is greater than the diameter of the pivot bolt 36, so that both of its ends protrude in winglike fashion and dimensionally identically past the pivot bolt. To enable the pivot bolt 36 to be introduced into the bearing bore 34 of the coupling part 32 in order to form the wiper lever 10, the bearing bore is provided on its jacket face 48 (FIG. 4) with two diametrically opposed push-through conduits 50, whose width 52 (FIG. 3) is adapted to the thickness 54 of the platelike extension 44 (FIG. 7) in such a way that the ends of the wings protruding beyond the diameter of the pivot bolt 36 can be passed without problem through the push-through conduits 50. This naturally also requires that the depth 56 (FIG. 5) of the push-through conduits 50 (FIG. 5) be dimensioned such that the size of the bore diameter plus twice the depth 56, added together, is at least as great as the length 46 of the platelike extension 44.

Figure 3:
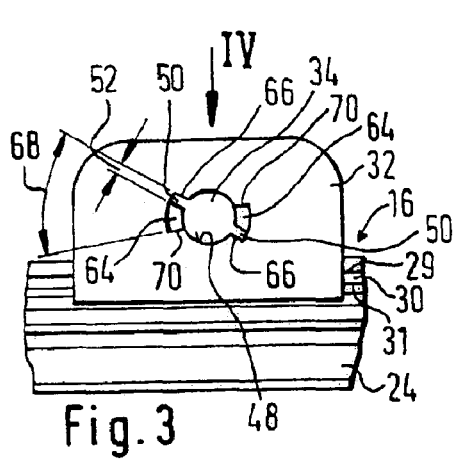
FIG. 3, a detail marked III in FIG. 1 of a wiper blade belonging to the wiper system, shown on a larger scale.

On its one side cheek 58, extending longitudinally of the wiper blade 16, the coupling part 32 has a ringlike protrusion 60, which surrounds the bearing bore 34. This protrusion can be formed for instance by an annular-collarlike extension of a prefabricated bearing bush that is seated in the coupling part 32. On its other long side or side cheek 62, the coupling part 32 has two diametrically opposed countersunk features 64, which viewed in the direction of the pivot axis 38 are embodied in annular-segmental form (FIGS. 3 and 6). One of the two push-through conduits 50 discharges into each of the two countersunk features 64—which countersunk features extend radially to the bore 34 and in the circumferential direction over a segment angle. The two countersunk features are disposed such that the push-through conduits 50 each discharge into the respective countersunk feature 64 near one annular-segmental end face 66. The other annular-segmental end faces 70, located away from the faces 66 by the amount of the segment angle 68, define the countersunk features 64 in the circumferential direction. The depth of the countersunk features 64 is at least as great as the height 74 of the platelike extension 44, measured in the direction of the pivot axis 38. The dimension 75 between the outer segmental faces is somewhat greater than the length 46 of the extension 44.

Figure 9:
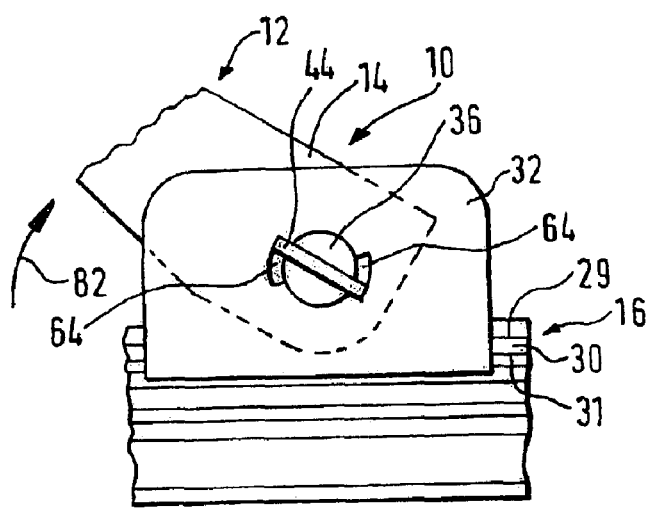
FIG. 9, the arrangement of FIG. 8 in an intermediate assembly position, in a side view.
Figure 10:
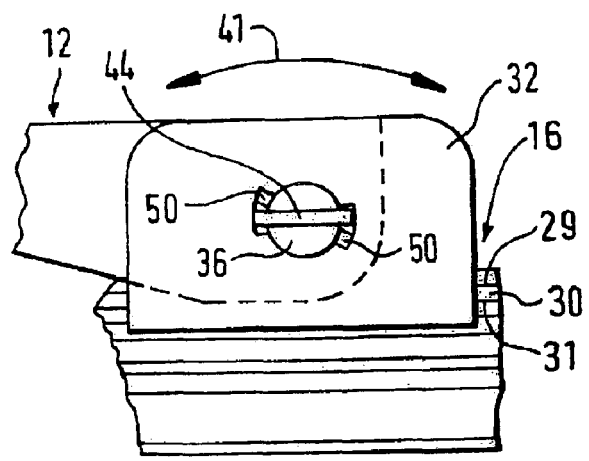
FIG. 10, the arrangement of FIG. 9 in the operating position.

The connection between the wiper arm 12 and the wiper blade 16 for forming the wiper lever 10 will now be explained, in conjunction with FIGS. 8–10. First, the two wiper lever parts 12 and 16 must be brought coaxially to one another into a position in which the extension 44, or in other words its two winglike protrusions, are aligned with the respective course of the push-through conduit 50 associated with it (FIG. 8). After that, the wiper blade is slipped in the direction of the arrow 76 onto the pivot bolt 36, whereupon the winglike ends of the extension 44 enter into their push-through conduits 50. Once the wiper blade 16, or its coupling part 32, with the end face 78 of the protrusion 70 strikes a flat cheek region 80 (FIG. 7), oriented toward it, of the wiper arm 12, the platelike extension 44 of the pivot bolt 36 has also emerged from the bearing bore 34 and is located with its winglike ends in the region of the respective two annular-segmental countersunk features 64 (FIG. 9). By pivoting the wiper blade 16 in the direction of the arrow 82 (FIG. 9), the wiper blade or the wiper lever 10 is made to reach its operating position, in which the winglike protrusions depart from their push-through conduits 50 and assume an operating position, shown in FIG. 10, once the wiper blade is placed against the window 20 to be wiped. To prevent unwanted noise during wiper operation and to assure proper guidance of the wiper blade on the wiper arm, the dimension 84 (FIG. 4) from the end face 78 to the bottom faces 68 of the countersunk features 64 is adapted carefully to the dimension 88 (FIG. 7) of the face 80 of the wiper arm 12 and the longitudinal end faces 81, oriented toward this face, of the winglike ends. It is understood that to prevent overdeterminations, the segment angle 68 in the oscillation direction (double arrow 41) is greater, by at least the thickness 54 of the extension 44, than the oscillating motion of the wiper blade about the pivot axis 38 that takes place during wiper operation. It is moreover clear that the two countersunk features 64 must be disposed with respect to the two push-through conduits 50 in such a way that a relative motion between the wiper arm 12 and the wiper blade 16 is possible during wiper operation. The annular-segmental end face 70 located away from the push-through conduit 50 is disposed such that it forms an oscillation limitation for the wiper blade 16 supported on the pivot bolt 36. This prevents the wiper blade, if the wiper arm has been folded away from the window, from rotating approximately 180° about the pivot axis into an incorrectly mounted position, in which—instead of the wiper strip 24—the coupling part 32 is then oriented toward the window 28.

The platelike extension 44 of the pivot bolt 36 thus forms a securing means for the wiper blade, so that the wiper blade cannot separate unintentionally—for instance during wiper operation—from the wiper arm. These securing means include stop faces 78, 86 of the wiper blade 16, which are spaced apart transversely to the pivot axis 38 from one another by a spacing 84 and which fittingly engage between securing faces 80 and 81, facing one another, of the wiper arm 12. The stop faces of the wiper blade are disposed on the two long sides of a coupling part 32 that is present on the wiper blade and has a bearing bore 34 for the pivot bolt 36. One securing face of the wiper arm 12 is a cheek region 80 facing toward the wiper blade. The other securing face of the wiper arm 12 is formed on the extension 44 of the pivot bolt 36, which extension protrudes out of the bearing bore 34, by means of the longitudinal end faces 81 (FIG. 8) of the extension 44 that are oriented toward the cheek region 80 and that are engaged from behind by the bottom or stop face 86 of the wiper blade facing away from the wiper arm. These stop faces 86 of the wiper blade are formed by the bottom faces 86 of the countersunk features 64, which faces cooperate with the faces 81, oriented toward them, of the winglike ends of the extension 44. By means of a suitable adaptation of the depth 72 of the countersunk features to the height 74 of the platelike extension 44, it is assured that the platelike extension will rest entirely in the countersunk features 64 and will not protrude from them. In order to remove the wiper blade 1b from the wiper arm 12, the wiper blade is pivoted out of its operating position (FIG. 9), counter to the arrow 82 in FIG. 9, until the extension 44 is aligned with the push-through conduits 50. After that, it can be pulled off the wiper arm 12, in the opposite direction from the arrow 76 in FIG. 8.

What is claimed is:

1. A wiper system, in particular for motor vehicle windows, having a driven wiper arm, (12), guided on the motor vehicle and movable between two turning points, on which, and in particular on whose free end (14), a pivot bolt (36) retained thereon is disposed, whose pivot axis (38) extends transversely to the longitudinal axis of the wiper arm, essentially in the direction of motion (double arrow 22) of the wiper arm (12), on which pivot bolt a wiper blade (16) is supported that can be pivoted about the pivot axis (38) and pressed against the window (28), and the wiper system has means for securing the wiper blade to the pivot bolt, which means have stop faces, disposed on the wiper blade transversely to the pivot axis and spaced apart from one another and pointing away from one another, which fittingly engage between securing faces, facing one another, of the wiper arm, wherein the stop faces (78, 86) of the wiper blade are disposed on the two long sides of a coupling part (32) that is present on the wiper blade and has a bearing bore (34) for the pivot bolt (36); that one securing face of the wiper arm is a cheek region (80) oriented toward the wiper blade; and that the other securing face (81) is embodied on an extension (44) of the pivot bolt (38), which extension engages the stop face (86), facing away from the wiper arm, of the wiper blade (16) from behind, and wherein the stop face of the wiper blade is embodied on the bottom face (86) of a countersunk feature (64) that extends from the opening of the bore in the circumferential direction and radially, which countersunk feature extends from the long side (62), remote from the wiper arm (12), of the coupling part (30) in the direction of the pivot axis.

2. The wiper system of claim 1, wherein the extension (44) is solidly joined to the pivot bolt (36); and that the bearing bore (34), on its jacket face (48), is provided with a push-through conduit (50) that is adapted to the extension.

3. The wiper system of claim 1, wherein a plurality of extensions are disposed on the pivot bolt (36); and that the bearing bore (34), on its jacket face (48), has a plurality of push-through conduits (50), adapted to the extensions and corresponding in number to the number of extensions.

4. The wiper system of claim 1, wherein the countersunk feature (64) is embodied in annular-segmental fashion in the direction of the pivot axis (38); and that the push-through conduit (50) discharges into the countersunk feature.

5. The wiper system of claim 4, therein the push-through conduit (50) discharges into the countersunk feature (64) near one annular-segmental end face (66).

6. The wiper system of claim 5, wherein the other annular-segmental end face (70) forms an oscillation limitation for the wiper blade (16) supported on the pivot bolt (36).

7. The wiper system of claim 5, wherein the segment angle (68) is greater than the oscillating motion of the wiper blade (16) about the pivot axis (38) of the pivot bolt (36) that occurs during wiping operation.

8. The wiper system of claim 1, therein a depth (72) of the counter sunk feature (64) is at least as great as the height (74) of the extension (44), measured in the direction of the pivot axis (38).

9. The wiper system of claim 1, wherein the coupling part (32) is retained on the upper band face (29), remote from the window (28), of a bandlike-elongated, spring-elastic support element (30), and over at least a portion it rests flatly on the support element; and that a rubber-elastic wiperstrip (24) that can be placed against the window is disposed, parallel to the longitudinal axis, on the lower band face (31), oriented toward the window (28), of the support element (30).

10. A wiper system, in particular for motor vehicle windows, having a driven wiper arm (12), guided on the motor vehicle and movable between two turning points, on which, and in particular on whose free end (14), a pivot bolt (36) retained thereon is disposed, whose pivot axis (38) extends transversely to the longitudinal axis of the wiper arm, essentially in the direction of motion (double arrow 22) of the wiper arm (12), on which pivot bolt a wiper blade (16) is supported that can be pivoted about the pivot axis (38) and pressed against the window (28), and the wiper system has means for securing the wiper blade to the pivot bolt, which means have stop faces, disposed on the wiper blade transversely to the pivot axis and spaced apart from one another and pointing away from one another, which fittingly engage between securing faces, facing one another, of the wiper arm, wherein the stop faces (78, 86) of the wiper blade are disposed on the two long sides of a coupling part (32) that is present on the wiper blade and has a bearing bore (34) for the pivot bolt (36); that one securing face of the wiper arm is a cheek region (80) oriented toward the wiper blade; and that the other securing face (81) is embodied on an extension (44) of the pivot bolt (36), which extension engages the stop face (86), facing away from the wiper arm, of the wiper blade (16) from behind, and wherein the extension (44) is configured as rectangular plate, one long side (81) of which faces toward the pivot bolt (36) and is joined, crossing the pivot axis, to the pivot bolt, preferably integrally, and its length (46) is greater than diameter of the pivot bolt (36).

11. A wiper blade assembly for a wiper system, in particular for motor vehicle windows, having a driven wiper arm (12), guided on the motor vehicle and movable between two turning points, on which, and in particular on whose free end (14), a pivot bolt (36) retained thereon is disposed, whose pivot axis (38) extends transversely to the longitudinal axis of the wiper arm, essentially in the direction of motion (double arrow 22) of the wiper arm (12), the wiper blade assembly comprising a wiper blade (16) supportable on the pivot bolt pivotally about the pivot axis (38) and pressed against the window (28), and means for securing the wiper blade to the pivot bolt, which means have stop faces disposed on the wiper blade transversely to the pivot axis and spaced apart from one another and pointing away from one another, which are fittingly engageable between securing faces, facing one another, of the wiper arm, wherein the stop faces (78, 86) of the wiper blade are disposed on the two long sides of a coupling part (32) that is present on the wiper blade and has a bearing bore (34) for the pivot bolt (36), and wherein one of the stop faces of the wiper blade is embodied on the bottom face (86) of a countersunk feature (64) that extends from the opening of the bore in the circumferential direction and radially, which countersunk feature extends from the long side (62), remote from the wiper arm (12), of the coupling part (30) in the direction of the pivot axis.

* * * * *